United States Patent [19]
Liebetruth

[11] Patent Number: 6,031,192
[45] Date of Patent: Feb. 29, 2000

[54] DRAWOUT CIRCUIT BREAKER WITH DISCONNECT POSITION INTERLOCK MECHANISM

[75] Inventor: Marc Liebetruth, Berlin, Germany

[73] Assignee: Siemens Aktiengesellschaft, München, Germany

[21] Appl. No.: 09/011,108

[22] PCT Filed: Jul. 24, 1996

[86] PCT No.: PCT/DE96/01440

§ 371 Date: May 13, 1998

§ 102(e) Date: May 13, 1998

[87] PCT Pub. No.: WO97/05680

PCT Pub. Date: Feb. 13, 1997

[30] Foreign Application Priority Data

Jul. 31, 1995 [DE] Germany ............. 195 29 051
Aug. 8, 1995 [DE] Germany ............. 195 30 682

[51] Int. Cl.$^7$ ............. H01H 9/00; H02B 11/00
[52] U.S. Cl. ............. 200/50.21; 200/50.26; 361/609
[58] Field of Search ............. 200/50.01, 50.21–50.27, 200/43.01–43.22; 361/604–618

[56] References Cited

U.S. PATENT DOCUMENTS

| | | | |
|---|---|---|---|
| 2,777,024 | 1/1957 | West | 200/50.17 |
| 2,921,998 | 1/1960 | Pokorny et al. | 200/50.26 |
| 4,002,865 | 1/1977 | Kuhn et al. | 200/50.22 |
| 4,004,113 | 1/1977 | Ericson et al. | 200/50.26 |
| 4,209,676 | 6/1980 | Clausing | 200/50.21 |
| 4,724,288 | 2/1988 | Kuglar | 200/50.01 |
| 4,757,169 | 7/1988 | Bophnene | 200/50.22 X |
| 4,926,286 | 5/1990 | Maki et al. | 200/50.22 X |
| 5,434,369 | 7/1995 | Tempco et al. | 200/50.26 |
| 5,459,293 | 10/1995 | Hodkin et al. | 200/50.26 |
| 5,661,627 | 8/1997 | Liebetruth et al. | 361/115 |
| 5,691,518 | 11/1997 | Jones et al. | 200/50.21 |

FOREIGN PATENT DOCUMENTS

| | | |
|---|---|---|
| 0 227 587 | 7/1987 | European Pat. Off. . |
| 35 45 780 | 6/1987 | Germany . |
| 39 08 056 | 9/1990 | Germany . |
| 6-78421 | 3/1994 | Japan . |

*Primary Examiner*—J. R. Scott
*Attorney, Agent, or Firm*—Kenyon & Kenyon

[57] ABSTRACT

An arrangement for controlling the movement of a drawout circuit-breaker, mounted in a switchgear, which can be moved in an operating position, test position and disconnect position relative to a drawout frame using an actuating shaft pivoted in the drawout frame and operated by a detachable actuating crank. A controllable closure member enables or prevents the actuating crank from coming into contact with the actuating shaft, and the drawout circuit-breaker can be removed from the drawout frame after a door is opened. Such arrangement is used in low-voltage circuit-breaker equipment.

4 Claims, 2 Drawing Sheets

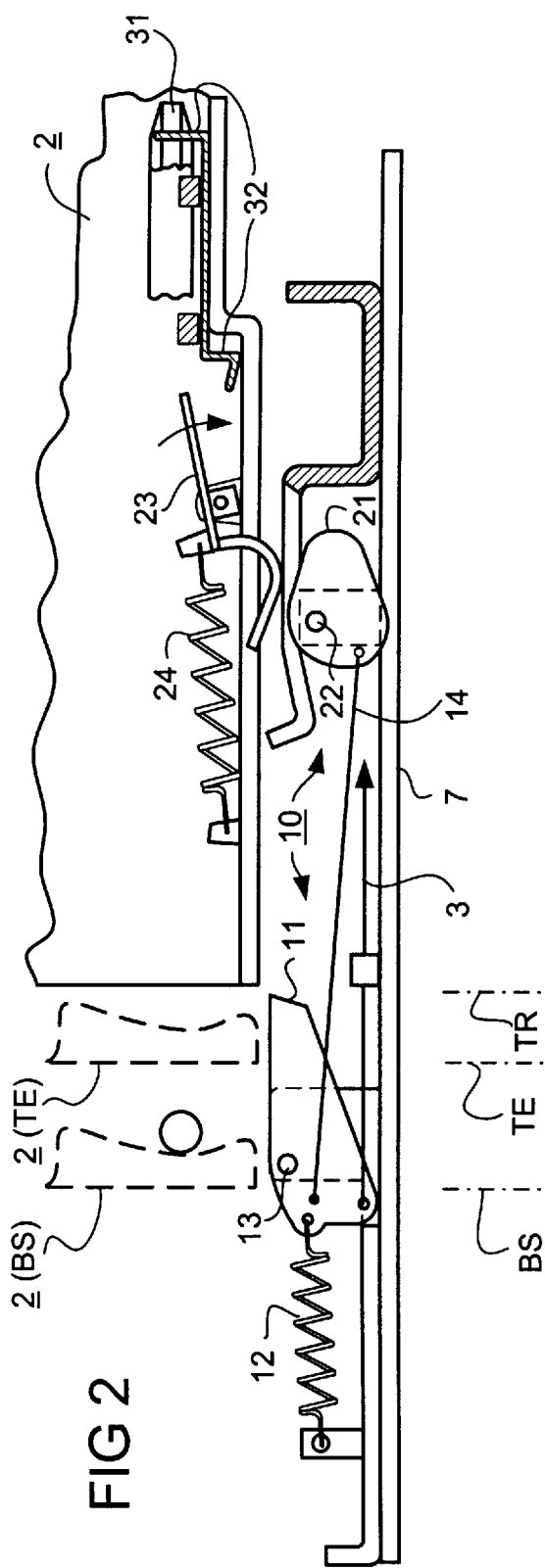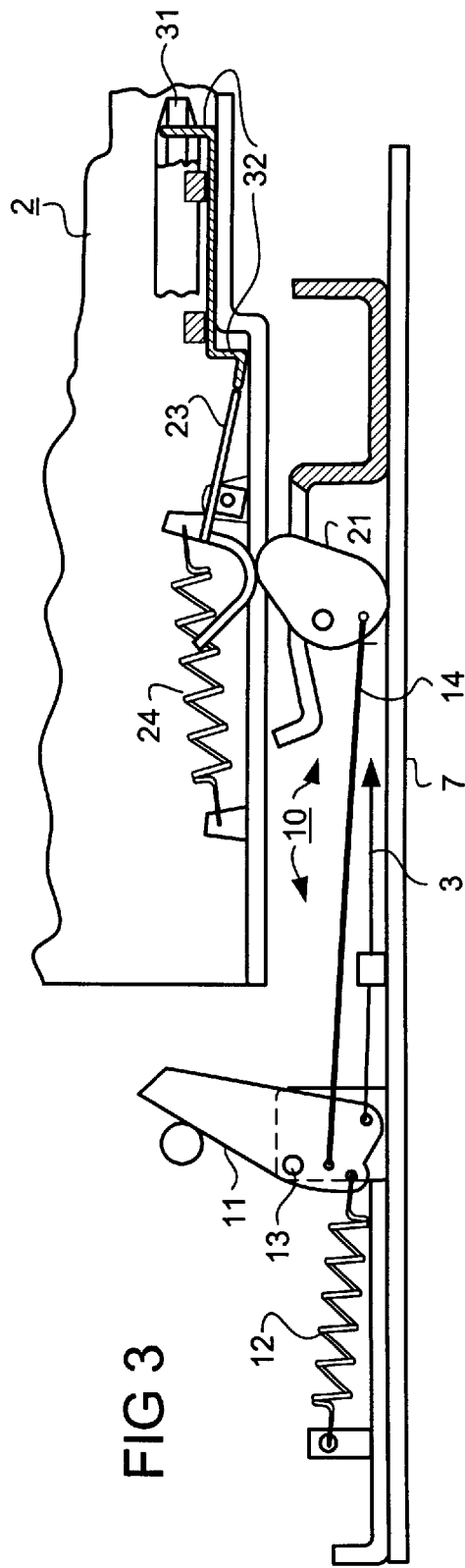

DRAWOUT CIRCUIT BREAKER WITH DISCONNECT POSITION INTERLOCK MECHANISM

FIELD OF THE INVENTION

The present invention relates to an arrangement for controlling the movement of a drawout circuit-breaker, mounted in a switchgear.

BACKGROUND INFORMATION

German Patent Application No. DE 35 45 780 A1 describes a switching device. Depending on the position of the switchgear door, a blockable and releasable stop element generally prevents a tool from engaging in order to move the drawout circuit-breaker in the drawout frame when the switchgear door is open. The stop element is permanently connected to a guide rod, which can be blocked by a bolt in all positions—operating position, test position and disconnect position—allowing the bolt to be directly actuated via a flexible transfer element by opening the switchgear door. The sole purpose of this measure is personal protection.

U.S. Pat. Nos. 2,777,024, 2,921,998 and 4,044,113 describe switchgear with drawout circuit-breakers. U.S. Pat. No. 2,777,024 takes into account only the standard conditions which prevent the circuit-breaker from moving when activated or when the circuit-breaker is being turned on. There is no mention of a locking arrangement.

Unlike the present invention, in the arrangement described in U.S. Pat. No. 2,921,998, the locking arrangement is located on the circuit-breaker for safe replacement of the circuit-breaker.

As described in U.S. Pat. No. 4,044,113, a closure member interacts with the rails in order to access the actuating shaft of the traveling mechanism and blocks the drawout circuit-breaker in the test or disconnect position. At the same time, this prevents the circuit-breaker from being replaced.

SUMMARY OF THE INVENTION

The present invention relates to an arrangement for controlling the movement of a drawout circuit-breaker, mounted in a switchgear. The drawout circuit-breaker can be moved in an operating position, test position and disconnect position relative to a drawout frame by means of an actuating shaft pivoted in the drawout frame and operated by a detachable actuating crank. A controllable closure member enables or prevents the actuating crank from coming into contact with the actuating shaft, and the drawout circuit-breaker can be removed from the drawout frame after a door is opened.

An object of the present invention is to expand the safety precautions for drawout circuit-breakers to include protection of the equipment, keeping the existing construction largely unchanged or implementing additional safety measures with as little additional technical equipment as possible. The invention achieves this goal by allowing the closure member to be controlled by a locking arrangement that is located in the drawout frame and interacts with the drawout circuit-breaker and by a closing cylinder located in the switchgear door in a way that prevents the drawout circuit-breaker from moving in a preferred position, especially in the disconnect position, while allowing the drawout circuit-breaker to be removed from the drawout frame.

The locking arrangement according to the present invention can be used to easily implement a multitude of equipment-related protective measures which can be easily adapted to a wide variety of safety conditions for protecting the equipment by incorporating the detection and evaluation of preferred positions of the drawout circuit-breaker within the drawout frame. An important consideration here is the fact the safety conditions concerned are determined by stationary units and are transferred to the drawout circuit-breaker when it is inserted into the drawout frame. As a result, the same safety conditions continue to apply when the drawout circuit-breaker is replaced by another drawout circuit-breaker.

In an advantageous exemplary embodiment of the present invention, the locking arrangement includes a position-detecting plate that is pivoted on a mounting plate and is connected to a cam. The cam is also pivoted on the mounting plate. The position-detecting plate is in contact with a Bowden control which transmits the rotary position of the closing cylinder so that the closure member remains blocked only when the drawout circuit-breaker is in the preferred position, and when the closing cylinder, which interacts with a locking plate that is fixed in place by a locking spring, is in the key release position accessible only in this preferred position.

The position-detecting plate for detecting the position of the drawout circuit-breaker in conjunction with the Bowden control that marks the rotary position of the closing cylinder in the switchgear door can be used to easily control the release of a key, which is possible only in the preferred position, in this case with the drawout circuit-breaker in the disconnect position. Here, the key cannot be removed from the closing cylinder of the switching device door in any of the other preferred positions—the operating position and the test position—since the locking plate continues to block the closure member.

In another advantageous embodiment of the present invention, the mounting plate, which forms part of the drawout frame, is located beneath the drawout circuit-breaker. This creates a very simple and compact locking arrangement which acts exclusively on the existing mechanical components to prevent the drawout circuit-breaker from moving within the drawout frame of the switching device.

In another advantageous exemplary embodiment of the invention, the locking arrangement includes a one-piece control unit that integrates the functions of the position-detecting plate and the cam, so that the connecting rods are not needed in this case. However, this requires modifying the design of the locking plate in the lower contour area of the movable drawout circuit-breaker so that it is no longer dependent on free spaces in the drawout circuit breaker region.

BRIEF DESCRIPTION OF THE DRAWINGS

FIG. 2 shows an operating mode of the locking arrangement in combination with the position of the drawout circuit-breaker within the drawout frame.

FIG. 3 shows an additional operating mode of the locking arrangement in combination with the position of the drawout circuit-breaker within the drawout frame.

DETAILED DESCRIPTION OF THE INVENTION

Figure 1:
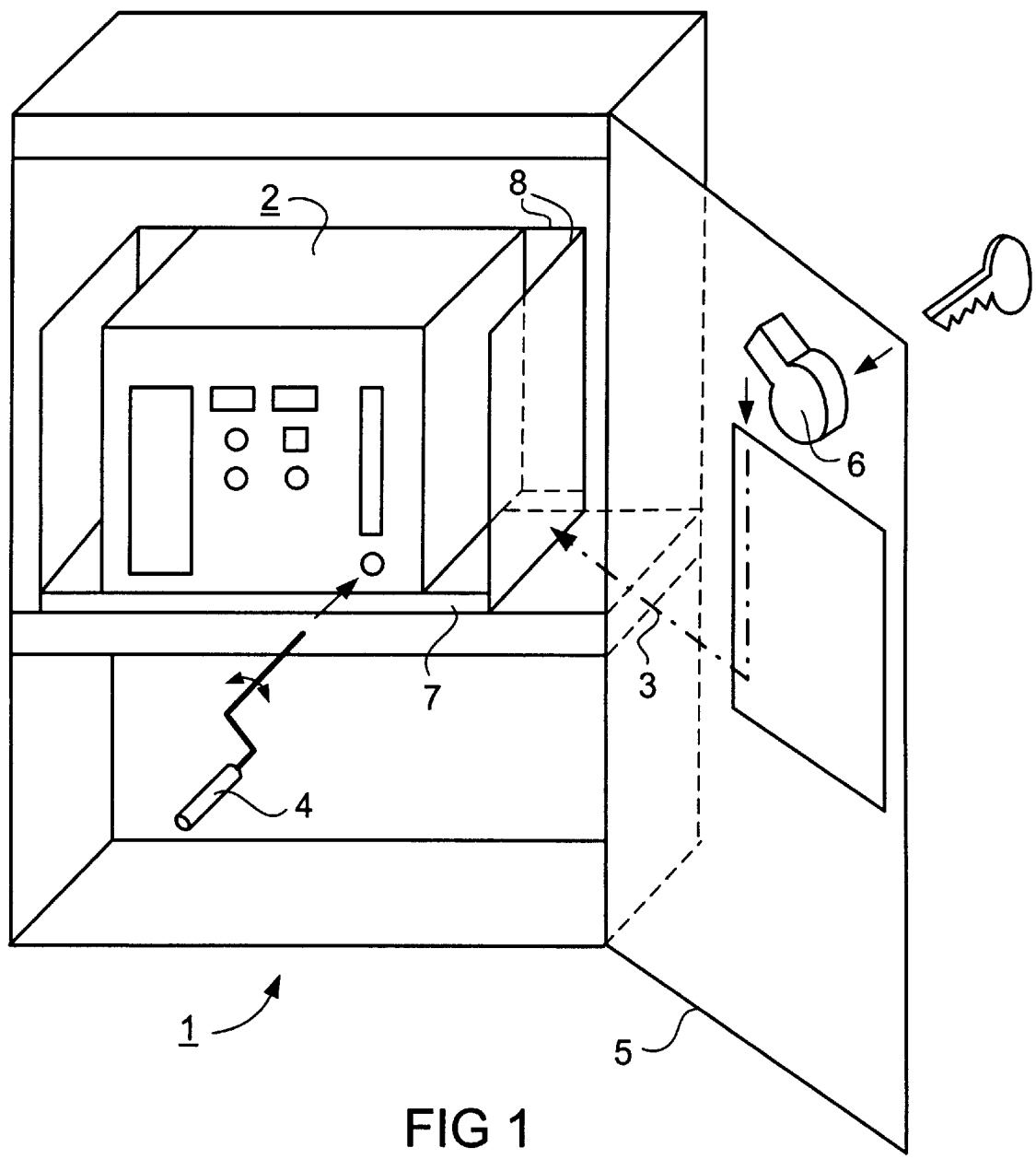
FIG. 1 shows a schematic diagram of a switchgear with a low-voltage circuit-breaker.

FIG. 1 shows a schematic diagram of a switchgear 1, in which drawout circuit-breaker 2 can be moved within drawout frame 8. Drawout circuit-breaker 2 is allowed to move by actuating crank 4 and an actuating shaft 31 (FIGS. 2 and 3), making it possible to move the drawout circuit-breaker from the operating position, to the test position and finally to the disconnect position. FIG. 1 also shows mounting plate 7, which holds the locking arrangement (not shown) affected by the position of closing cylinder 6 by means of Bowden control 3. Closing cylinder 6 is accessible from the outside and is located in switchgear door 5.

FIGS. 2 and 3 show locking arrangement 10 in two different operating modes. FIG. 2 shows the ability of the drawout circuit-breaker to move when unlocked. FIG. 3 shows the ability of the drawout circuit-breaker to move when blocked.

FIG. 2 indicates that drawout circuit-breaker 2 can be placed in different preferred positions: operating position BS, test position TE and disconnect position TR. Locking arrangement 10 includes position-detecting plate 11 in order to detect the preferred position. This position-detecting plate is pivoted directly on a bent part of mounting plate 7 in pivot bearing 13. Position-detecting plate 11 is held in a preferred position by means of a guide spring 12. The figure also shows that Bowden control 3, one end of which (not shown) is connected to the contour of closing cylinder 6 (FIG. 1), comes into contact with position-detecting plate 11. Locking arrangement 10 also contains cam 21, which is also connected to position-detecting plate 11 by connecting rods 14. Cam 21 of locking arrangement 10 is also pivoted in the region of a bend (not shown) in mounting plate 7 by means of a pivot bearing 22. Locking plate 23, which can be swivelled by the action of cam 21 in such a way that closure member 32 can block or release access to actuating shaft 31, is located on movable drawout circuit-breaker 2 above cam 21. Locking spring 24, which places locking plate 23 in a preferred position when it is not being influenced by cam 21, also acts upon locking plate 23. When it is not being blocked, closure member 32 can be moved in an axial direction, so that, when released, an actuating crank can be pushed onto actuating shaft 31 in a manner that is not shown, friction-locking the actuating crank to the hexagonal area (not shown) of actuating shaft 31 when it comes into contact with the latter.

FIG. 3 shows locking arrangement 10 when blocked, which can be achieved by moving the drawout circuit-breaker in the disconnect position so that the closing cylinder movement actuates position-detecting plate 11 when the key shown in FIG. 1 is turned in the lock. As a result, cam 21, which is connected via the connecting rods, swivels locking plate 23 in such a manner that it blocks the axial movement of closure member 32. This ensures that the key can be removed only when the drawout circuit-breaker is in the disconnect position, while the key cannot be removed from closing cylinder 6 (FIG. 1) when the drawout circuit-breaker is in either the operating position or test position. In this state, actuating crank 4 (FIG. 1) cannot be brought into contact with actuating shaft 31 either (FIG. 2), thereby preventing drawout circuit-breaker 2 (FIG. 2) from being able to move from the disconnect position. In spite of this locking mechanism, drawout circuit-breaker 2 (FIG. 2) can, however, be removed from the drawout frame when in its disconnect position TR (FIG. 2). Although locking plate 23 is once again released as cam 21 descends, locking plate 23 is automatically blocked again by the unchanged position of cam 21 when the drawout circuit-breaker is replaced in the drawout frame.

What is claimed is:

1. An arrangement for controlling the movement of a drawout circuit breaker, the drawout circuit breaker being removably mounted in an enclosure, the enclosure including a door and a drawout frame, the drawout circuit breaker being removable from the drawout frame when the door is in an open position, comprising:

an actuating shaft for moving the circuit breaker to an operating position, a test position and a disconnect position, relative to the drawout frame;

a detachable actuating crank for operating the actuating shaft;

a controllable closure member for enabling the actuating crank to come into contact with the actuating shaft, and for preventing the actuating crank from coming into contact with the actuating shaft;

a locking arrangement positioned in the drawout frame and interacting with the drawout circuit breaker, the locking arrangement for controlling the closure member; and a closing cylinder positioned in the door of the enclosure, the closing cylinder for preventing the drawout circuit breaker from being moved from the disconnect position, while allowing the drawout circuit-breaker to be removed from the drawout frame.

2. The arrangement according to claim 1, wherein the locking arrangement includes:

a position-detecting plate pivotably mounted on a mounting plate, and being in contact with a Bowden control, the Bowden control transmitting a rotary position of the closing cylinder; and a cam pivotably mounted on the mounting plate, and coupled to the position-detecting plate, the cam being pivoted by a connecting rod;

wherein, the closure member is capable of being in a blocked position, the closure member being in the blocked position only when the drawout circuit breaker is in the disconnect position and the closing cylinder is in a key release position, the key release position being accessible only when the drawout circuit breaker is in the disconnect position, the controllable closure member interacting with a pivotable locking plate that is pivoted by the cam against the action of a restoring spring from a normal position to a blocking position.

3. The arrangement according to claim 2, wherein when the closure member is in the blocked position, the closure member prevents the actuating crank from coming into contact with the actuating shaft.

4. The arrangement according to claim 2, wherein the mounting plate forms a part of the drawout frame, the mounting plate being positioned beneath the drawout circuit-breaker.

\* \* \* \* \*